US010985915B2

United States Patent
McCann et al.

(10) Patent No.: US 10,985,915 B2
(45) Date of Patent: Apr. 20, 2021

(54) ENCRYPTING DATA IN A PRE-ASSOCIATED STATE

(71) Applicant: BlackBerry Limited, Waterloo (CA)

(72) Inventors: Stephen McCann, Southampton (GB); Michael Peter Montemurro, Toronto (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 174 days.

(21) Appl. No.: 15/485,786

(22) Filed: Apr. 12, 2017

(65) Prior Publication Data

US 2018/0302219 A1    Oct. 18, 2018

(51) Int. Cl.
*H04L 9/08* (2006.01)
*H04L 9/30* (2006.01)
(Continued)

(52) U.S. Cl.
CPC .......... *H04L 9/0869* (2013.01); *H04L 9/0825* (2013.01); *H04L 9/0861* (2013.01);
(Continued)

(58) Field of Classification Search
CPC ..... H04W 12/06; H04W 24/10; H04W 12/04; H04W 12/00409; H04W 64/00; H04W 12/04031; H04W 12/0401; H04W 12/04071; H04W 12/001; H04L 9/3226; H04L 9/083; H04L 9/065; H04L 9/3271; H04L 9/14; H04L 9/0643; H04L 9/0861; H04L 63/0435; H04L 63/0428; H04L 9/3263; H04L 9/32; H04L 63/0823; H04L 29/06; H04L 9/0825; H04L 63/0846;
(Continued)

(56) References Cited

U.S. PATENT DOCUMENTS 5,201,000 A * 4/1993 Matyas ............... G06F 9/30003
380/30
6,052,466 A * 4/2000 Wright ................... H04L 9/065
380/262

(Continued)

FOREIGN PATENT DOCUMENTS

EP  2517489 A1 * 10/2012 ......... H04L 63/0869
RU  2421922 C2 * 6/2011 ........... H04L 9/0838

OTHER PUBLICATIONS

Information technology,Telecommunications and information exchange between systems, Local and metropolitan area networks, Specific requirements, Part 11, Wireless LAN MAC and PHY Layer specifications—Amendment 6: Medium Access Control (MAC) Security Enhancements; pp. 197; Jul. 23 (Year: 2004).*

(Continued)

Primary Examiner — Samson B Lemma
Assistant Examiner — Ali H. Cheema
(74) Attorney, Agent, or Firm — Trop, Pruner & Hu, P.C.

(57) ABSTRACT

In some examples, an access point (AP) receives, from a wireless device during a pre-associated state between the AP and the wireless device, a request, a first value, and an encrypted version of the first value. The AP sends, to the wireless device during the pre-associated state, an encrypted version of a second value relating to an encryption key that is based on the first value, and a response to the request, the response encrypted using the encryption key.

16 Claims, 5 Drawing Sheets

(51) Int. Cl.
*H04L 9/32* (2006.01)
*H04W 12/04* (2021.01)
*H04W 12/00* (2021.01)
*H04L 29/06* (2006.01)
*H04W 12/06* (2021.01)

(52) U.S. Cl.
CPC .............. *H04L 9/30* (2013.01); *H04L 9/3271* (2013.01); *H04L 63/0428* (2013.01); *H04L 63/0435* (2013.01); *H04L 63/061* (2013.01); *H04L 63/0869* (2013.01); *H04L 63/162* (2013.01); *H04W 12/001* (2019.01); *H04W 12/0401* (2019.01); *H04W 12/04031* (2019.01); *H04W 12/04071* (2019.01); *H04W 12/06* (2013.01); *H04L 2209/80* (2013.01)

(58) Field of Classification Search
CPC ....... H04L 9/0869; H04L 9/30; H04L 63/061; H04L 63/0869; H04L 63/162; H04L 2209/80; G06F 21/10; G06F 9/30003; G06F 21/83
USPC ..... 380/270, 277, 262, 30, 286, 260, 46, 44, 380/225, 2, 278, 279; 705/51; 713/168, 713/169, 171, 193, 165; 726/10
See application file for complete search history.

(56) References Cited

U.S. PATENT DOCUMENTS

| | | | | |
|---|---|---|---|---|
| 6,314,521 | B1* | 11/2001 | Debry | H04L 9/3263 726/10 |
| 6,856,800 | B1 | 2/2005 | Henry et al. | |
| 6,950,523 | B1* | 9/2005 | Brickell | H04L 9/3226 380/277 |
| 7,240,366 | B2* | 7/2007 | Buch | H04L 29/06027 380/225 |
| 7,298,851 | B1* | 11/2007 | Hendricks | G06F 21/10 380/277 |
| 8,259,935 | B2* | 9/2012 | Riedl | H04L 9/0643 380/260 |
| 9,137,621 | B2 | 9/2015 | McCann | |
| 9,197,414 | B1* | 11/2015 | Martin | H04L 9/14 |
| 9,204,299 | B2 | 12/2015 | McCann | |
| 9,253,589 | B2 | 2/2016 | McCann | |
| 9,755,825 | B2* | 9/2017 | O'Brien | H04L 9/0844 |
| 2002/0035687 | A1* | 3/2002 | Skantze | H04L 9/0825 713/168 |
| 2003/0016819 | A1* | 1/2003 | Cheng | H04L 63/04 380/2 |
| 2005/0004873 | A1* | 1/2005 | Pou | G06F 21/10 705/51 |
| 2005/0276418 | A1* | 12/2005 | Hagiwara | H04L 9/32 380/270 |
| 2006/0018481 | A1* | 1/2006 | Nagano | H04L 9/3271 380/270 |
| 2006/0129848 | A1* | 6/2006 | Paksoy | H04W 12/00409 713/193 |
| 2006/0218398 | A1* | 9/2006 | Sood | H04L 63/0823 713/168 |
| 2008/0016350 | A1* | 1/2008 | Braskich | H04L 9/3273 713/169 |
| 2009/0092252 | A1* | 4/2009 | Noll | H04L 9/083 380/277 |
| 2011/0208965 | A1* | 8/2011 | MacHani | H04L 63/0435 713/168 |
| 2012/0250866 | A1* | 10/2012 | Matsuo | H04L 63/061 380/279 |
| 2012/0284517 | A1* | 11/2012 | Lambert | H04L 63/0823 713/169 |
| 2012/0288090 | A1* | 11/2012 | Singhal | H04L 63/0428 380/46 |
| 2013/0182840 | A1* | 7/2013 | Buckley | H04L 9/0861 380/44 |
| 2013/0227279 | A1* | 8/2013 | Quinlan | G06F 21/445 713/165 |
| 2014/0050320 | A1* | 2/2014 | Choyi | H04L 63/061 380/270 |
| 2014/0052989 | A1* | 2/2014 | Jones | G06F 21/85 713/171 |
| 2014/0064486 | A1* | 3/2014 | Abraham | H04W 12/04 380/270 |
| 2014/0376721 | A1* | 12/2014 | Perez | H04L 9/3226 380/270 |
| 2015/0245202 | A1* | 8/2015 | Patil | H04W 12/06 380/279 |
| 2015/0310427 | A1* | 10/2015 | Yi | G06F 21/83 705/64 |
| 2015/0381618 | A1* | 12/2015 | Lin | H04L 63/0846 713/169 |
| 2016/0080372 | A1* | 3/2016 | Martin | H04L 9/14 713/168 |
| 2016/0234688 | A1* | 8/2016 | Masuyama | H04W 12/06 |
| 2017/0230856 | A1* | 8/2017 | Vamaraju | H04W 64/00 |
| 2019/0191301 | A1* | 6/2019 | Fang | H04L 63/0428 |

OTHER PUBLICATIONS

Improving the security of wireless LANs by Managing 802.1x Disassociation by Ping Ding, JoAnne Holiday and Aslihan Celik; Published in: First IEEE Consumer Communications and Networking Conference, 2004 in Las Vegas, NV, USA pp. 6; Dated: Apr. 19, 2004.*

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.

IEEE Standard for Information technology (IEEE Std 802.11p-2010)—Telecommunications and Information Exchange Between Systems Local and Metropolitan Area Networks—Specific Requirements Part 11: Wireless LAN Medium Access Control (MAC) and Physical Layer (PHY) Specifications, Amendment 6: Wireless Access in Vehicular Environments, Jul. 15, 2010 (51 pages).

IEEE Draft Standard for Information technology (IEEE P802.11aq/D7.0)—Telecommunications and Information Exchange Between Systems Local and Metropolitan Area Networks—Specific Requirements Part 11: Wireless LAN Medium Access Control (MAC) and Physical Layer (PHY) Specifications, Amendment 3: Pre-Association Discovery, Sep. 2016 (50 pages).

European Patent Office, International Search Report and Written Opinion for PCT/EP2018/054307 dated Apr. 26, 2018 (14 pages).

IEEE P802.11-REVmc/D3.0, Draft Standard for Information technology—Telecommunications and information exchang: Between systems—Local and metropolitan area neworks—Specific requirements—Part 11: Wireless LAN Medium Access Control (MAC) and Physical Layer (PHY) Specifications, Jun. 2014 (3701 pages).

IEEE ISO/IEC 8802-11, IEEE STD 802.11i-2004, Information technology—Telecommunications and information exchange between systems—Local and metropolitan area networks—Specific requirements, Part 11: Wireless LAN Medium Access Control (MAC) and Physical Layer (PHY) specifications, Amendment 6: Medium Access Control (MAC) Security Enhancement, Jul. 23, 2004 (198 pages).

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, 2793 pages.

Qi Wang et al., Broadcom, IEEE 802.11-16/1498r1, FTM Security in Associated and Un-associated States, Nov. 2016 (9 pages).

Certicom, Certicom Asset Management System, News Releases, BlackBerry Expands Embedded Software Delivery with New Partner Program dated on or before Apr. 2017 (7 pages).

(56) References Cited

OTHER PUBLICATIONS

C. Daboo, Apple Inc., Network Working Group, Request for Comments: 5689, Updates: 4791, 4918, Category: Standards Track, Extended MKCOL for Web Distributed Authoring and Versioning (WebDAV), Sep. 2009 (12 pages).
Max Riegel, IEEE 802 Enhanced Network Detection and Selection, Aug. 2013 (12 pages).
Wikipedia, Generic Advertisement Service last updated Mar. 2, 2015 (2 pages).
Wikipedia, Pretty Good Privacy last updated Apr. 5, 2017 (15 pages).
Krawczyk et al., Internet Engineering Task Force (IETF) Request for Comments: 5869, Category: Informational, ISSN: 2070-1721, HMAC-based Extract-and-Expand Key Derivation Function (HKDF), May 2010 (14 pages).
European Patent Office, Communication pursuant to Article 94(3) EPC for Appl. No. 18707332.5 dated Jun. 16, 2020 (7 pages).

* cited by examiner

ENCRYPTING DATA IN A PRE-ASSOCIATED STATE

BACKGROUND

Devices such as computers, handheld devices, vehicles, appliances, or other types of devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

BRIEF DESCRIPTION OF THE DRAWINGS

Some implementations of the present disclosure are described with respect to the following figures.

Figure 1:
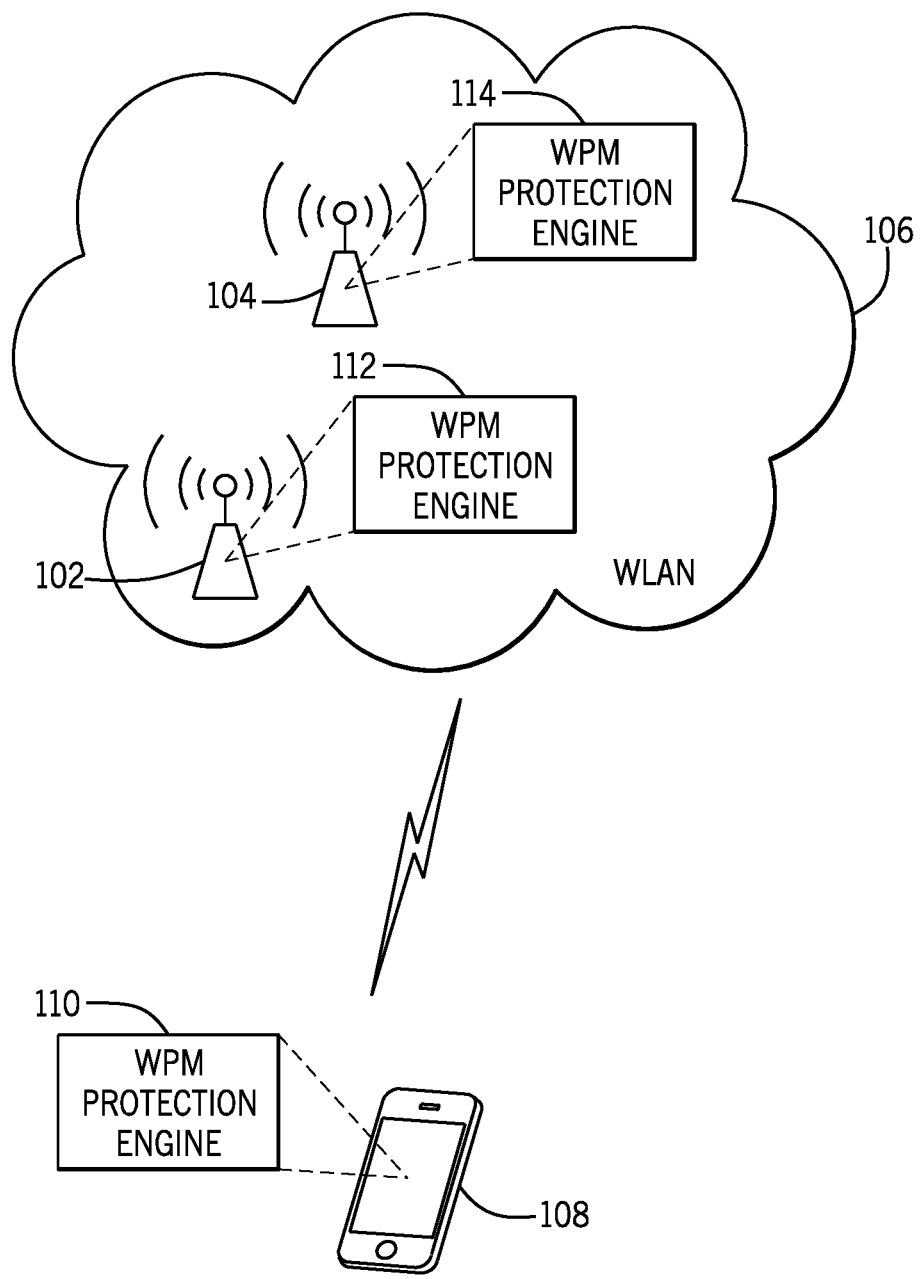
FIG. 1 is a block diagram of an example network arrangement according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In a wireless local area network (WLAN), a wireless device may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 or Wi-Fi Alliance Specifications.

In other examples, wireless networks can operate according to other protocols. More generally, techniques or mechanisms according to some implementations of the present disclosure can be used with various types of wireless networks, such as WLANs, cellular networks, or other wireless networks. In a cellular network, an AP can refer to a wireless access network node, such as a base station or enhanced node B (eNodeB) in a cellular network that operates according to the Long-Term Evolution (LTE) standards as provided by the Third Generation Partnership Project (3GPP). The LTE standards are also referred to as the Evolved Universal Terrestrial Radio Access (E-UTRA) standards. An AP can also refer to a fifth generation (5G) wireless access network node, or another type of wireless access network node.

Examples of wireless devices include computers (e.g., tablet computers, notebook computers, desktop computers, etc.), handheld devices (e.g. smart phones, personal digital assistants, head-mounted device, etc.), wearable devices (smart watches, electronic eyeglasses, head-mounted devices, etc.), game appliances, health monitors, vehicles (or equipment in vehicles), cargo transportation units (e.g., trailers, containers, etc.), Internet of Things (IoT) devices, or other types of endpoint or user devices that are able to communicate wirelessly. Wireless devices can include mobile devices and/or fixed position devices. More generally, a wireless device can refer to an electronic device that is able to communicate wirelessly.

In the ensuing discussion, reference is made to communications and operations that are according to the IEEE 802.11 standard. It is noted that techniques or mechanisms according to some implementations of the present disclosure can be applied to communications and operations according to other standards.

According to the IEEE 802.11 standard, a wireless device can operate in one of several connection states:
State 1: initial start state, unauthenticated, un-associated.
State 2: authenticated, not associated.
State 3: authenticated and associated (pending Robust Security Network or RSN authentication).
State 4: authenticated and associated.

In accordance with some examples, reference is made to a pre-associated state of a wireless device. In the context of IEEE 802.11, the pre-associated state of a wireless device refers to State 1 noted above.

More generally, a pre-associated state of a wireless device refers to a state before the wireless device has established a connection (e.g., association in the terminology of the IEEE 802.11 standard) with a network, and before the wireless device has been authenticated. This state can also be referred to as prior to association.

According to the IEEE 802.11, a wireless device can communicate layer 2 (Medium Access Control or MAC) frames over an air interface with an AP while the wireless device is in the pre-associated state. Examples of such layer 2 frames include a broadcast beacon transmitted by the AP that can be received by the wireless device. As another example, a wireless device can send a probe request to an AP to determine more information from the AP, such as a regulatory domain or the supported data rates, and the AP can respond to the probe request with a probe response containing the requested information.

Probe requests and probe responses are examples of low level management frames that can be used to construct transport protocols that then allow an exchange of public action frames between a wireless device and an AP. A public action frame is an IEEE 802.11 management frame which is transmitted between two stations (STAs) with minimal or no connectivity state. It is used for Inter-BSS (basic service set) and AP to unassociated-STA communications, and intra-BSS communications. A STA is a IEEE 802.11 term for a wireless device.

The following are examples of specific transport mechanisms that utilize public action frames for WLAN pre-association messages (WPMs), which are messages exchanged between a wireless device and an AP while the wireless device is in the pre-associated state. The transport mechanisms that utilize public action frames for WPMs include a Generic Advertisement Service (GAS) transport mechanism, a Fine Timing Measurement (FTM) transport mechanism and various other mechanisms as defined in IEEE 802.11.

GAS is used as a transport mechanism for various advertisement and query protocols, which allow bidirectional transmission of frames between STAs in a pre-associated state. The FTM mechanism allows for an FTM procedure that allows a STA to determine the STA's distance and relative location from another STA. A STA can either be a wireless device or an AP.

Public action frames are encapsulated within management frames that carry a MAC address and other parameters of the transmitting device (either the wireless device or the AP), and the receiving device can determine the identity of the transmitting device.

Devices in a WLAN can exchange messages in the pre-associated state for various different purposes, including network discovery (where a wireless device can discover presence of a WLAN), service discovery (where a wireless device can discover available services reachable via a WLAN) and proximity (where a first wireless device can detect whether a second wireless device is in the proximity of the first wireless device). In further examples, a wireless device in a pre-associated state can also communicate short bursts of traffic data or bearer data, such as for IoT discovery and management, which pertains to discovery of IoT devices and management of such IoT devices.

Issues

When a wireless device in a pre-associated state communicates with another device, such as the AP, the communicating devices cannot take advantage of the WLAN security association that is established during association. As a result, WPMs (WLAN pre-association messages) are transmitted in the clear, since no authentication exchange has occurred between the transmitting and receiving devices before the WPMs are communicated. Transmitting a message in the clear refers to transmitting the message without any protection applied to the message, where the protection can include encryption of the message or other processing to render the content of the message unreadable by an unauthorized entity. Transmitting a message in the clear also prevents the receiver from verifying the integrity of the message.

Also, information in a WPM cannot be used to verify trust in the source of the WPM, so that a receiver is unable to determine with any confidence the source of a given WPM who it says it is. Moreover, information in the WPM has the potential to leak knowledge about a wireless device or the access network or other information to an un-authorized device.

WPMs transmitted in the clear are not suitable for secure data or data that specifies some integrity, such as verifying the source of a WPM. In many cases, it is desired that integrity protection and encryption protection (confidentiality) be provided for a response message that responds to a request. In some scenarios, requests do not contain sensitive information, so integrity and encryption protection for requests may not have to be provided.

Examples of contents of WPMs that are to be protected include location information, such as those in FTM (Fine Timing Measurement) frames, and price or charge information, such as those in GAS (Generic Advertisement Service) frames. Unauthorized entities are able to gain access to the contents of such frames if left unprotected.

Solutions

FIG. 1 is a block diagram of an example arrangement that includes APs 102 and 104 that are part of a WLAN 106. A wireless device 108 is able to perform wireless communications with either the AP 102 or 104. Such wireless communications can include communications while the wireless device 108 is in a pre-associated state. Such communications include WPMs.

Although a reference is made to WPMs in some examples, it is noted that in further examples, other types of messages can be communicated between the wireless device 108 and an AP while the wireless device 108 is in the pre-associated state.

Also, although FIG. 1 shows just one wireless device 108, it is noted that there can be more than one wireless device 108. Also, in other examples, a different number (1 or greater than 1) of APs can be present in the WLAN 106.

To support protected communications of WPMs, the wireless device 108 includes a WPM protection engine 110, and each AP 102 and 104 can include a respective WPM protection engine 112 and 114. An "engine" can refer to a hardware processing circuit or a combination of a hardware processing circuit and machine-readable instructions executable on the hardware processing circuit. A hardware processing circuit can include any or some combination of the following: a microprocessor, a core of a multi-core microprocessor, In some implementations of the present disclosure, a WPM engine in a transmitter of a WPM is able to encrypt a WPM using any of a number of different encryption algorithms. One encryption algorithm is a Pretty Good Privacy (PGP) algorithm, which provides cryptographic privacy and authentication for data communication. PGP follows the OpenPGP standard described by Request for Comments (RFC) 4880 for encrypting and decrypting data.

Another encryption algorithm is one provided by a crypto-tool from Certicom Corp. In other examples, other types of encryption algorithms can be used.

While the WPM protection engine in a transmitter is able to encrypt a WPM, the WPM protection engine in a receiver is able to decrypt the encrypted WPM.

Figure 2:
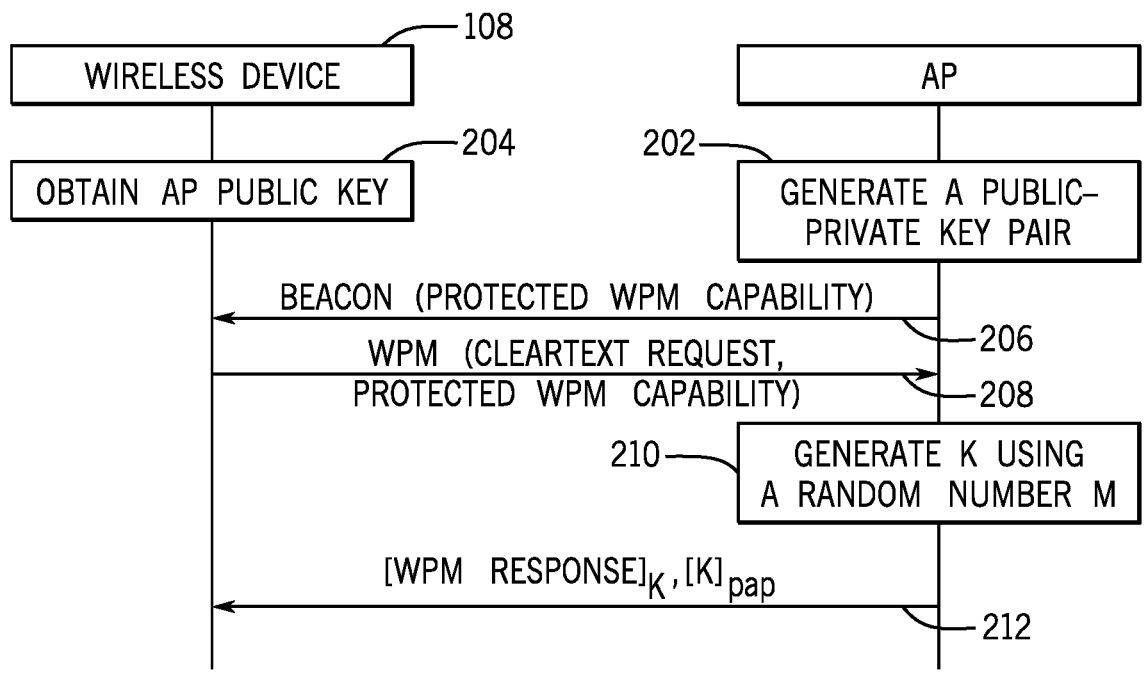
FIGS. 2-5 are flow diagrams of processes of a wireless device and an access point (AP) according to various implementations.

FIG. 2 is a flow diagram showing tasks and messages between the wireless device 108 and an AP (either 102 or 104). In the ensuing discussion and in the figures, the following notation is used: $[X]_K$ signifies that the message X is encrypted using the cryptographic key K.

The tasks of FIG. 2 can be performed by WPM protection engines in the wireless device 108 and the AP, respectively.

The AP generates (at 202) a public-private key pair, where the public key is denoted as $P_{ap}$, and the corresponding private key is denoted as $p_{ap}$. A public key is a cryptographic key that is distributed by the sender to a select group of devices.

Using an out-of-band procedure, the wireless device 108 obtains (at 204) the public key of the AP. The public key of the AP is not distributed to any unauthorized device. In other words, only authorized devices are provided with the public key of the AP.

The AP transmits (at 206) a beacon that contains a flag indicating that it supports a protected WPM capability, which refers to the capability of the AP to protect WPM messages, such as by use of the WPM protection engine in the AP. More generally, the AP can transmit any type of message, whether broadcast to multiple wireless devices or unicast to a specific wireless device, that contains an indicator of support for protecting messages communicated with a wireless device that is in a pre-associated state.

Once the wireless device 108 detects an AP with the protected WPM capability (as indicated by the flag in the beacon transmitted at 206, for example), the wireless device 108 transmits (at 208) a WPM with a cleartext request and a flag (or other indicator) indicating the wireless device's support of the protected WPM capability. The cleartext request refers to a request that is not protected by encryption. The request can be a request for information from the AP.

The AP receives the WPM from the wireless device 108, and determines based on the flag in the WPM that the wireless device 108 has the protected WPM capability. The AP generates (at 210) a symmetric key K using a random number M (e.g., 128 bits or more in length). The random number M can be generated using a random number generator in the AP. The random number M is input into a key derivation function at the AP to produce the symmetric key K. The symmetric key can be used to both encrypt data and decrypt the encrypted data (encrypted using the symmetric key).

To reduce computational complexity, the symmetric key K is either derived by the AP or mutually derived by both the wireless device 108 and the AP after the exchange of keying material. An example key derivation function to produce the symmetric key is the HMAC-based Extract-and-Expand Key Derivation Function (HKDF) described in RFC 5869. In other examples, other key derivation functions can be used.

The AP encrypts a WPM response (which is responsive to the cleartext request in the WPM sent by the wireless device 108) using the symmetric key K, and also encrypts the symmetric key K using the AP private key $p_{ap}$. The AP transmits (at 212) the encrypted WPM response, [WPM Response]$_K$, and the encrypted symmetric key, [K]$_{pap}$, to the wireless device 108.

Upon reception of the encrypted WPM response and the encrypted symmetric key from the AP, the wireless device 108 decrypts [K]$_{pap}$ to recover the symmetric key K, where the decryption of [K]$_{pap}$ is performed using the AP public key $P_{ap}$. Using the recovered symmetric key K, the wireless device 108 decrypts [WPM Response]$_K$.

Figure 3:
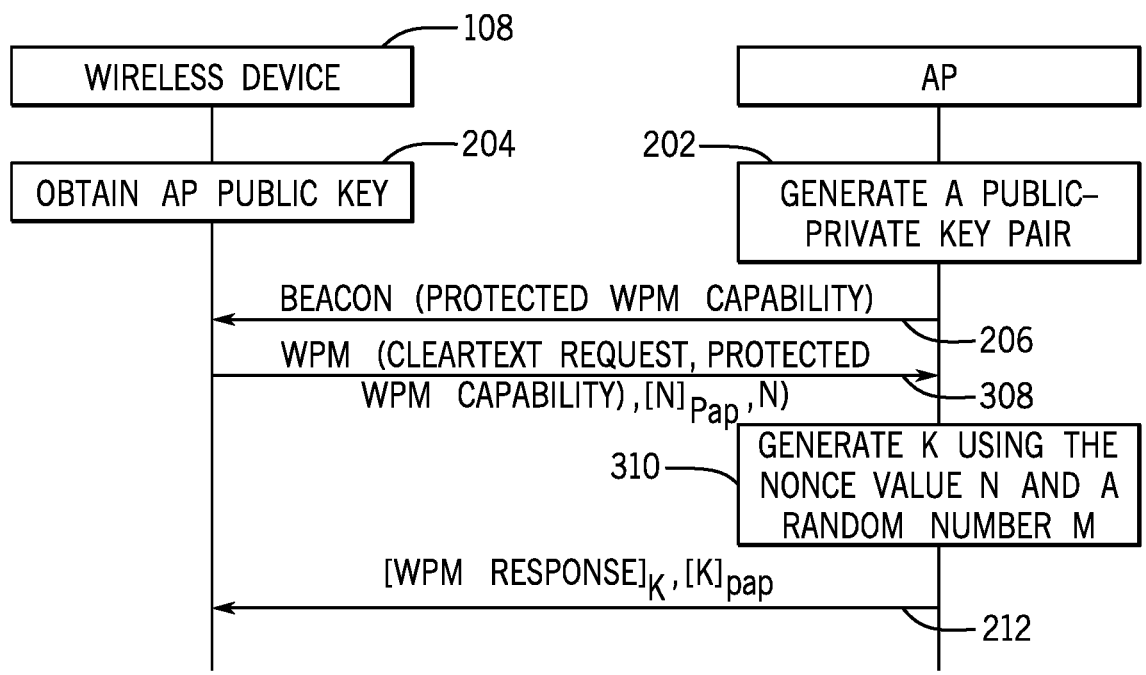

FIG. 3 is a flow diagram showing tasks and messages between the wireless device 108 and an AP, according to alternative implementations. Some of the tasks of FIG. 3 are the same as or similar to respective tasks of FIG. 2, and share the same reference numerals.

In FIG. 3, the wireless device 108 transmits (at 308) a WPM including a cleartext request, a flag (or other indicator) indicating the wireless device's support of the protected WPM capability, and a cleartext nonce value N together with an encrypted nonce value, [N]$_{Pap}$, where [N]$_{Pap}$ is produced by encrypting N using the AP's public key $P_{ap}$.

A nonce value is a unique value that is used only once. In some examples, the nonce value is a random number or pseudo-random number.

Upon receiving the WPM (at 308), the AP decrypts [N]$_{Pap}$ using the private key $p_{ap}$ to produce the nonce value N, and the AP compares the produced nonce value N with the cleartext version of N in the received WPM. If the produced nonce value N matches the cleartext version of N in the received WPM, then that proves to the AP that the wireless device 108 knows the AP's public key $P_{ap}$. In addition, the AP can use the nonce value N as part of the algorithm to generate (at 310) the symmetric key K using the nonce value N and the random number M as inputs to a key derivation function.

Figure 4:
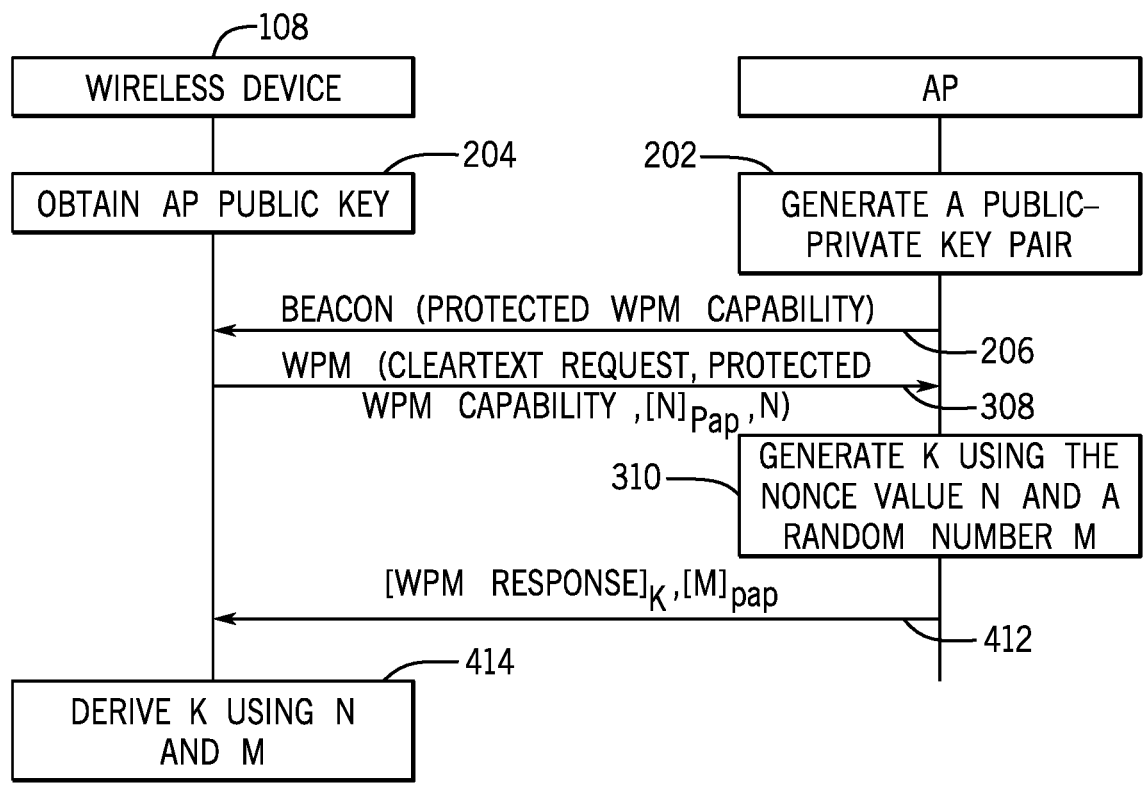

FIG. 4 is a flow diagram showing tasks and messages between the wireless device 108 and an AP, according to further alternative implementations. The process of FIG. 4 is similar to that of FIG. 3, except that the AP transmits (at 412) an encrypted random number, [M]$_{pap}$, along with [WPM Response]$_K$, where [M]$_{pap}$ is generated by encrypting the random number M using the private key $p_{ap}$. This is in contrast to the flow of FIG. 3, where the encrypted symmetric key, [K]$_{pap}$, is transmitted (at 312).

In response to the information (transmitted at 412), the wireless device 108 decrypts [M]$_{pap}$ using the private key $p_{ap}$ to recover the random number M, and then derives (at 414) the symmetric key K by using the nonce value N and the recovered random number M as inputs to a key derivation function.

Extended Capabilities Element

The following describes an example of an information element that can be used to carry a flag indicating support by a device (e.g., the wireless device 108 or AP) for the protected WPM capability, as discussed above.

The flag indicating the protected WPM capability can be carried in the IEEE 802.11 Extended Capabilities field table, by adding an information element in the Extended Capabilities field table. For example, in the Extended Capabilities field table according to IEEE 802.11-16, bit 77 can be added (underlined), as set forth below:

| Extended Capabilities Field Table | | |
|---|---|---|
| Bit | Information | Notes |
| 75 | Solicited PAD | Indicates support for solicited PAD procedure (see 11.25a.3). |
| 76 | Service Information | Indicates support for service information procedure (see 11.25.3.2.1). |
| <u>77</u> | <u>Protected WPM</u> | <u>Indicates support for protected WLAN pre-association messages</u> |

Transmission of the Protected WPM bit within a beacon or probe response frame allows a STA (station), either a wireless device or an AP, to advertise the STA is protected WPM capable.

Protection Elements

The following describes elements of frames that can be used to carry an encrypted response message, such as [WPM Response]$_K$, and information items relating to the symmetric key K described above, where the information items can include the key K (both cleartext and encrypted versions), and the nonce value (both cleartext and encrypted versions).

The following new IEEE 802.11 elements can be created, which can be added to Table 9-77 of IEEE 802.11-2016, for example.

| Element IDs | | | | |
|---|---|---|---|---|
| Element | Element ID | Element ID Extension | Extensible | Fragmentable |
| Public Action Encrypted Payload | 255 | 17 | no | no |
| Wrapped Key | 255 | 18 | no | no |

The new elements include a Public Action Encrypted Payload element and a Wrapped Key element.

Public Action Encrypted Payload Element

The Public Action Encrypted Payload element contains the payload field of the public action frame to which the Public Action Encrypted Payload element is attached.

| Public Action Frame Protection Element format | | | |
|---|---|---|---|
| Element ID | Length | Element ID Extension | Encrypted Payload |
| Octets: 1 | 1 | 1 | variable |

The Element ID, Length, and Element ID Extension fields are defined in IEEE 802.11-2016 section 9.4.2.1. The Encrypted Payload field contains the set of elements that are encrypted in the response, such as $[WPM\ Response]_K$ discussed above.

Wrapped Key Element

The Wrapped Key element contains encrypted key information and allows the key information to be transported within a public action frame. The Wrapped Key element is positioned towards the end of the public action frame.

| Wrapped Key Element format | | | | |
|---|---|---|---|---|
| Element ID | Length | Element ID Extension | Key Type | Key Payload |
| Octets: 1 | 1 | 1 | 1 | variable |

The Element ID, Length, and Element ID Extension fields are defined in IEEE 802.11-2016 section 9.4.2.1. The Key Type field identifies the type of the Key Payload field. The key type values are defined as follows:

| Key Types | |
|---|---|
| Value | Description |
| 0 | Cleartext |
| 1 | Wrapped Key |
| 2 | Wrapped Nonce |

The Key Payload field in the Wrapped Key element is the value of an item relating to a key, such as the nonce value or the symmetric key discussed above. If the Key Type field is set to "0", then the Key Payload field contains a cleartext nonce. If the Key Type field is set to "1", then the Key Payload field contains an encrypted symmetric key. If the Key Type field is set to "2", then the Key Payload field contains an encrypted nonce.

Error Codes

New error codes can be created to provide feedback to both the wireless device 108 and the AP when errors occur:

Wrapped Key element key type not valid.
Wrapped Key element key payload cannot be decrypted.
Wrapped Key element key payload has incorrect length.
Protection element payload cannot be decrypted.
Protection element payload has incorrect length.
In other examples, other error codes can be used.

In further examples, to avoid giving an attacker information on how the security protocol failed, it may be better to have either one or two errors, such as a "WPM failed" error or a "WPM Not supported" error.

Protection Element Use

The following describes examples of expected use of the foregoing elements as applied to the solutions discussed further above.

In some specific examples, protection can be applied to the payload field transported within GAS public action frames, such as Access Network Query Protocol (ANQP) elements. This is described as follows.

ANQP operates as a simple query and response protocol that is used by a wireless device to discover a range of information from an Access Network (AN) server. This AN server is either co-located with an AP or is located within a LAN, which is the layer 2 network to which the AP is connected. ANQP request and response messages are transported within the payload fields of WPMs.

Figure 5:
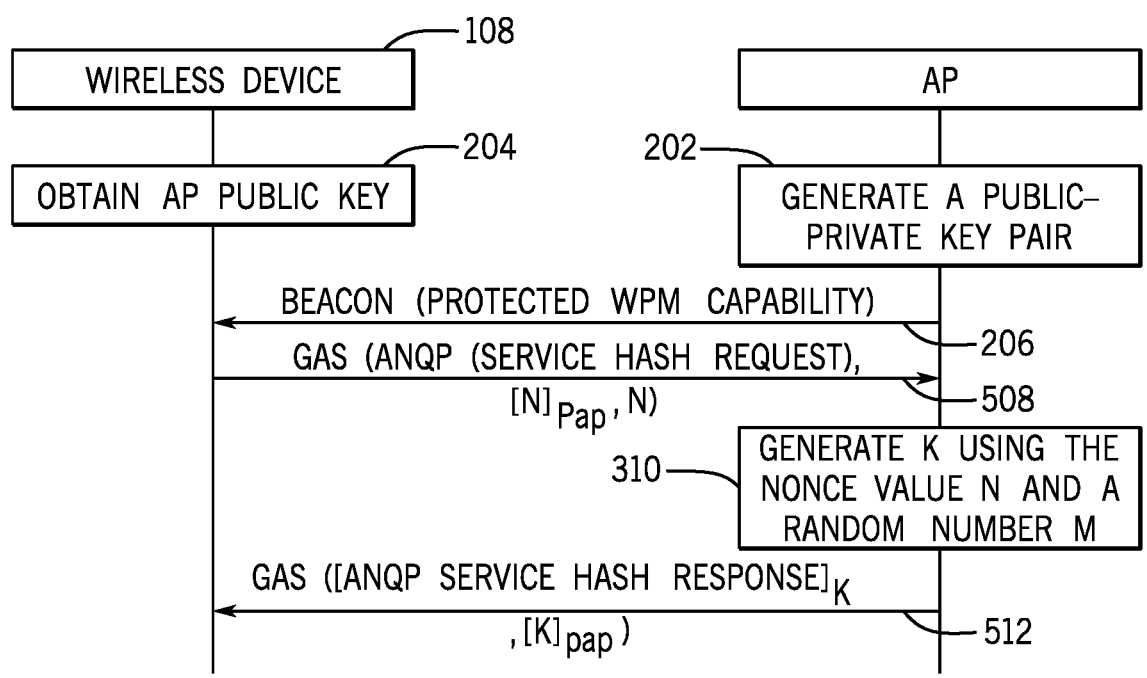

FIG. 5 is a flow diagram of example tasks and messages according to further examples. Tasks in FIG. 5 that are the same as or similar to corresponding tasks in FIG. 3 share the same reference numerals.

The beacon transmitted (at 206) by the AP to the wireless device 108 carries the Protected WPM bit (set to "1") to indicate that the AP supports this capability. In response to receiving the information in the beacon, the wireless device 108 can create a request message, which in the example of FIG. 5 is an ANQP Service Hash request.

The wireless device 108 transmits (at 508) an ANQP Service Hash request, along with an encrypted nonce value, $[N]_{Pap}$, and a cleartext nonce value N. The format of this message is as follows:

| GAS/ANQP Request Message Using Protection | |
|---|---|
| GAS Public Action Frame Header | Query Request Payload (ANQP Service Hash Request + Wrapped Key-Key Type 1 + Wrapped Key-Key Type 0) |

The foregoing indicates that the ANQP Service Hash request is carried in the payload of a GAS public action frame. The Wrapped Key element (Key Type 1) contains an encrypted nonce encrypted using the public key of the AP (i.e., $P_{ap}$), and the Wrapped Key element (Key Type 0) contains the cleartext nonce value. The Wrapped Key elements are added as additional elements on the end of a traditional ANQP Service Hash request and then all carried within the GAS Query Request Payload.

The AP responds (at 512) with an ANQP Service Hash response, encapsulated within an Encrypted Payload element (encrypted using the symmetric key K), together with a symmetric key K encrypted using the AP's private key ($p_{ap}$). The format of this message is as follows:

| Protected GAS/ANQP response message example | |
|---|---|
| GAS Public Action Frame Header | Query Response Payload (Encrypted Payload-ANQP Service Hash Response + Wrapped Key-Key Type 1) |

The encrypted ANQP Service Hash response is carried in the payload of a GAS public action frame. More specifically, the Encrypted Payload element encapsulates the traditional ANQP Service Hash response. The Wrapped Key (Key Type 1) contains the symmetric key encrypted using the AP's private key ($p_{ap}$).

As public action frames use dialog tokens to pair requests with responses, the wireless device 108 will know that the GAS response noted above will have an encrypted payload as it will have used the same dialog token in the request discussed further above. Dialog tokens are explained in IEEE 802.11-2016 in some examples.

In other examples, instead of using GAS Public Action frames transporting ANQP requests and responses, other types of public action frames and messages can be used, such as FTM messages.

System Architecture

By using techniques or mechanisms according to some implementations of the present disclosure, data can be communicated in a pre-associated state, while protecting such data, and without having to perform full authentication.

Figure 6:
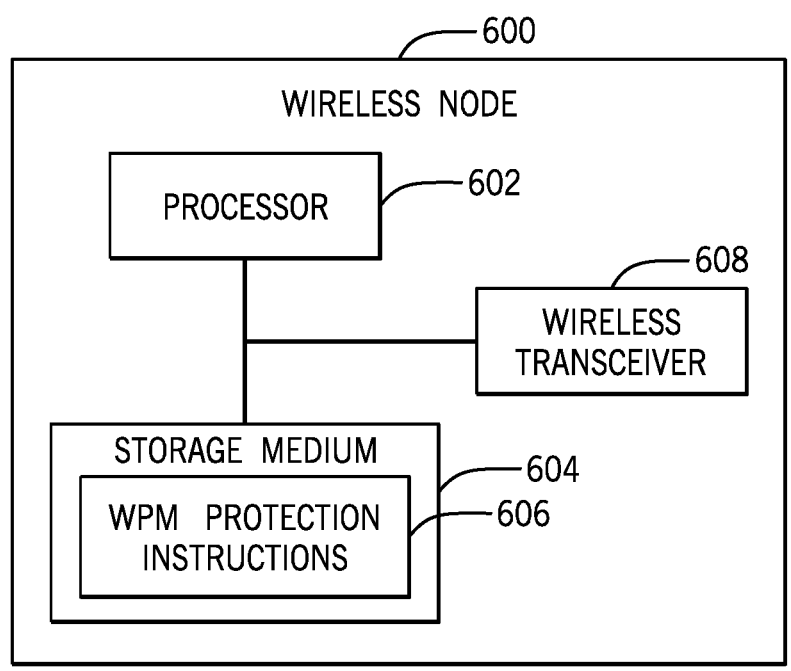
FIG. 6 is a block diagram of a wireless node according to some examples.

FIG. 6 is a block diagram of a system 600 according to some examples. The system 600 can be any of the wireless device 108 and the AP 102 or 104. The system 600 includes a processor 602 (or multiple processors). A processor can include a microprocessor, a core of a multi-core microprocessor, a microcontroller, a programmable integrated circuit, a programmable gate array, or another hardware processing circuit.

The system 600 further includes a non-transitory machine-readable or computer-readable storage medium 604 storing machine-readable instructions, such as WPM protection instructions 606 that are executable on the processor 602 to perform various tasks as discussed in the present disclosure. Instructions executable on a processor can refer to the instructions executing on one processor or on multiple processors.

The system 600 includes a communication transceiver or wireless transceiver 608 to communicate wireless signals (e.g., radio frequency or RF signals).

The storage medium 604 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of an access point (AP), comprising:
   performing protected pre-association communications between the AP and a wireless device;
   transmitting in a beacon a protected pre-association communications indicator, the protected pre-association communications indicator indicating support by the AP for communication of protected data during a pre-associated state between the AP and the wireless device;
   receiving, from the wireless device during the pre-associated state, a message after the transmitting of the beacon, the message including a request, the message indicating support by the wireless device for the communication of protected data during the pre-associated state;
   generating, at the AP, a public-private key pair and a symmetric key; and
   sending, from the AP to the wireless device during the pre-associated state, a response to the request, the response comprising an encrypted version of the symmetric key,
   wherein;
      the AP determines, based on the received message, that the wireless device supports the communication of protected data during the pre-associated state, and
      wherein the generating of the symmetric key and the sending of the response comprising the encrypted version of the symmetric key is responsive to the determining that the wireless device supports the communication of protected data during the pre-associated state.

2. The method of claim 1, wherein the public-private key pair comprises a public key and a private key.

3. The method of claim 2, wherein the encrypted version of the symmetric key is based on encrypting the symmetric key using the private key.

4. The method of claim 1, wherein the request is an Access Network Query Protocol (ANQP) request, and the response is an ANQP response.

5. The method of claim 1, wherein the request and the response comprise fine timing measurement (FTM) messages.

6. The method of claim 1, wherein the response is carried by a public action frame comprising a Public Action Encrypted Payload element.

7. The method of claim 1, further comprising:
   communicating, between the AP and the wireless device, an error code indicating an error associated with the encrypted version of the symmetric key.

8. An access point (AP) comprising:
   a communication transceiver to communicate with a wireless device; and
   at least one processor configured to:
      perform protected pre-association communications between the AP and the wireless device;
      transmit in a beacon a protected pre-association communications indicator, the protector pre-association communications indicator indicating support by the AP for communication of protected data during a pre-associated state between the AP and the wireless device;
      receive, from the wireless device during the pre-associated state, a message after the transmitting of the beacon, the message including a request, the message indicating support by the wireless device for the communication of protected data during the pre-associated state;
      determine based on the received message, that the wireless device supports the communication of protected data during the pre-associated state;
      generate, at the AP, a public-private key pair and a symmetric key; and
      send, to the wireless device during the pre-associated state, a response to the request, the response comprising an encrypted version of the symmetric key,
      wherein the generating of the symmetric key and the sending of the response comprising the encrypted version of the symmetric key is responsive to the determining that the wireless device supports the communication of protected data during the pre-associated state.

9. The AP of claim 8, wherein the encrypted version of the symmetric key is based on encrypting the symmetric key using a public key of the public-private key pair.

10. The AP of claim 8, wherein the encrypted version of the symmetric key is based on encrypting the symmetric key using a private key of the public-private key pair.

11. The AP of claim 8, wherein the request is an Access Network Query Protocol (ANQP) request, and the response is an ANQP response.

12. A wireless device comprising:
a communication transceiver to communicate with an access point (AP); and
at least one processor configured to:
perform protected pre-association communications between the wireless device and the AP;
receive, from the AP, a beacon comprising a protected pre-association communications indicator, the protected pre-association communications indicator indicating support by the AP for communication of protected data during a pre-associated state between the AP and the wireless device;
after the receiving of the beacon, send, to the AP during the pre-associated state, a message, the message including a request, the message indicating support by the wireless device for the communication of protected data during the pre-associated state; and
receive, at the wireless device from the AP during the pre-associated state, a response to the request, the response comprising an encrypted version of a symmetric key generated by the AP that also generated a public-private key pair, wherein the AP is to generate the symmetric key and send the response comprising the encrypted version of the symmetric key responsive to the AP determining, based on the message, that the wireless device supports the communication of protected data during the pre-associated state.

13. The wireless device of claim 12, wherein the encrypted version of the symmetric key is based on encrypting the symmetric key using a private key of the public-private key pair.

14. The wireless device of claim 12, wherein the request is an Access Network Query Protocol (ANQP) request, and the response is an ANQP response.

15. A method comprising:
performing protected pre-association communications between a wireless device and an access point (AP);
receiving, by the wireless device from the AP, a beacon comprising a protected pre-association communications indicator, the protected pre-association communications indicator indicating support by the AP for communication of protected data during a pre-associated state between the AP and the wireless device;
after the receiving of the beacon, sending, by the wireless device to the AP during the pre-associated state, a message, the message including a request, the message indicating support by the wireless device for the communication of protected data during the re-associated state; and
receiving, by the wireless device from the AP during the pre-associated state, a response to the request, the response comprising an encrypted version of a symmetric key generated by the AP that also generated a public-private key pair, wherein the AP is to generate the symmetric key and send the response comprising the encrypted version of the symmetric key responsive to the AP determining, based on the message, that the wireless device supports the communication of protected data during the pre-associated state.

16. The method of claim 15, further comprising deriving, by the wireless device, the symmetric key based on the encrypted version of the symmetric key in the response.

* * * * *